US007894604B2

(12) United States Patent
Nishioka et al.

(10) Patent No.: US 7,894,604 B2
(45) Date of Patent: Feb. 22, 2011

(54) QUANTUM CRYPTOGRAPHIC COMMUNICATION APPARATUS

(75) Inventors: Tsuyoshi Nishioka, Tokyo (JP); Toshio Hasegawa, Tokyo (JP); Hirokazu Ishizuka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1199 days.

(21) Appl. No.: 10/590,970

(22) PCT Filed: May 17, 2004

(86) PCT No.: PCT/JP2004/007001

§ 371 (c)(1),
(2), (4) Date: Aug. 29, 2006

(87) PCT Pub. No.: WO2005/112335

PCT Pub. Date: Nov. 24, 2005

(65) Prior Publication Data

US 2007/0182968 A1    Aug. 9, 2007

(51) Int. Cl.
H04L 9/00 (2006.01)
H04L 9/08 (2006.01)
H04L 9/12 (2006.01)
H04L 25/00 (2006.01)

(52) U.S. Cl. .......................... 380/255; 380/44; 380/260; 380/277; 380/278; 713/168; 713/171; 714/2; 714/746; 714/798

(58) Field of Classification Search ................. 380/255; 356/491

See application file for complete search history.

(56) References Cited

U.S. PATENT DOCUMENTS 6,188,768 B1    2/2001 Bethune et al.

(Continued)

FOREIGN PATENT DOCUMENTS

JP    5-241104 A    9/1993

(Continued)

OTHER PUBLICATIONS

Assche, G.V., et al, ' Reconciliation of a Quantum-Distributed Gaussian Key ', IEEE Transactions on Information Theory, vol. 50, No. 2, Feb. 2004, pp. 394-400, http://citeseerx.ist.psu.edu/viewdoc/download?doi=10.1.1.104.2483&rep=rep1&type=pdf.*

(Continued)

*Primary Examiner* — Edan Orgad
*Assistant Examiner* — Ronald Baum
(74) *Attorney, Agent, or Firm* — Birch, Stewart, Kolasch & Birch, LLP

(57) ABSTRACT

Provided is a quantum cryptography communication apparatus capable of preventing a go photon pulse from being phase modulated and also capable of freely selecting any repetitive frequency of a light source. In the quantum cryptography communication apparatus, a quantum receiver apparatus includes: a light source; an optical path loop having a multiplexing/interfering means for generating time difference twin photon pulses from the photon pulses of the light source and for multiplexing and causing interference between a signal optical pulse corresponding to a retrograde quantum and a reference optical pulse; a bypass optical path having a phase modulator for phase modulating only the received reference optical pulse; and a photon detector for observing the interfered light passed through the optical path loop, and a quantum transmitter apparatus includes: a polarized wave rotating means for rotating polarization planes of the twin photon pulses at a right angle in a non-reciprocal manner; a phase modulator for phase modulating and returning the signal optical pulse passed through the polarized wave rotating means, to the quantum receiver apparatus; and a beam attenuating means.

5 Claims, 8 Drawing Sheets

U.S. PATENT DOCUMENTS 7,126,691 B2 * 10/2006 Gat .......................... 356/450
7,583,803 B2 * 9/2009 Trifonov ..................... 380/278

FOREIGN PATENT DOCUMENTS

JP          2003-289298  A     10/2003

OTHER PUBLICATIONS

Nishioka et al., Proceedings of the 2002 Symposium on Cryptography and Information Security, vol. 1 of 2, pp. 43-48.
Nishioka et al., IEEE Photonics Technology Letters, Apr. 19, 2002, vol. 14, No. 4, pp. 576-578.
Hasegawa et al., Proceedings of the 2003 Symposium on Cryptography and Information Security, vol. 2 of 2, pp. 1125-1130.
Hasegawa et al., IEICE Transactions on Fundamentals of Electronics, Communications and Computer Sciences, vol. E85-A, No. 1, Jan. 1, 2002, pp. 149-157.
Ribordy et al., Electronics Letters, 32, (22), pp. 2116-2117, 1998.
Bethune, D.S. et al., "An Autocompensating Fiber-Optic Quantum Cryptography System Based on Polarization Splitting of Light", IEEE Journal of Quantum Electronics, vol. 36, No. 3, Mar. 2000.

* cited by examiner

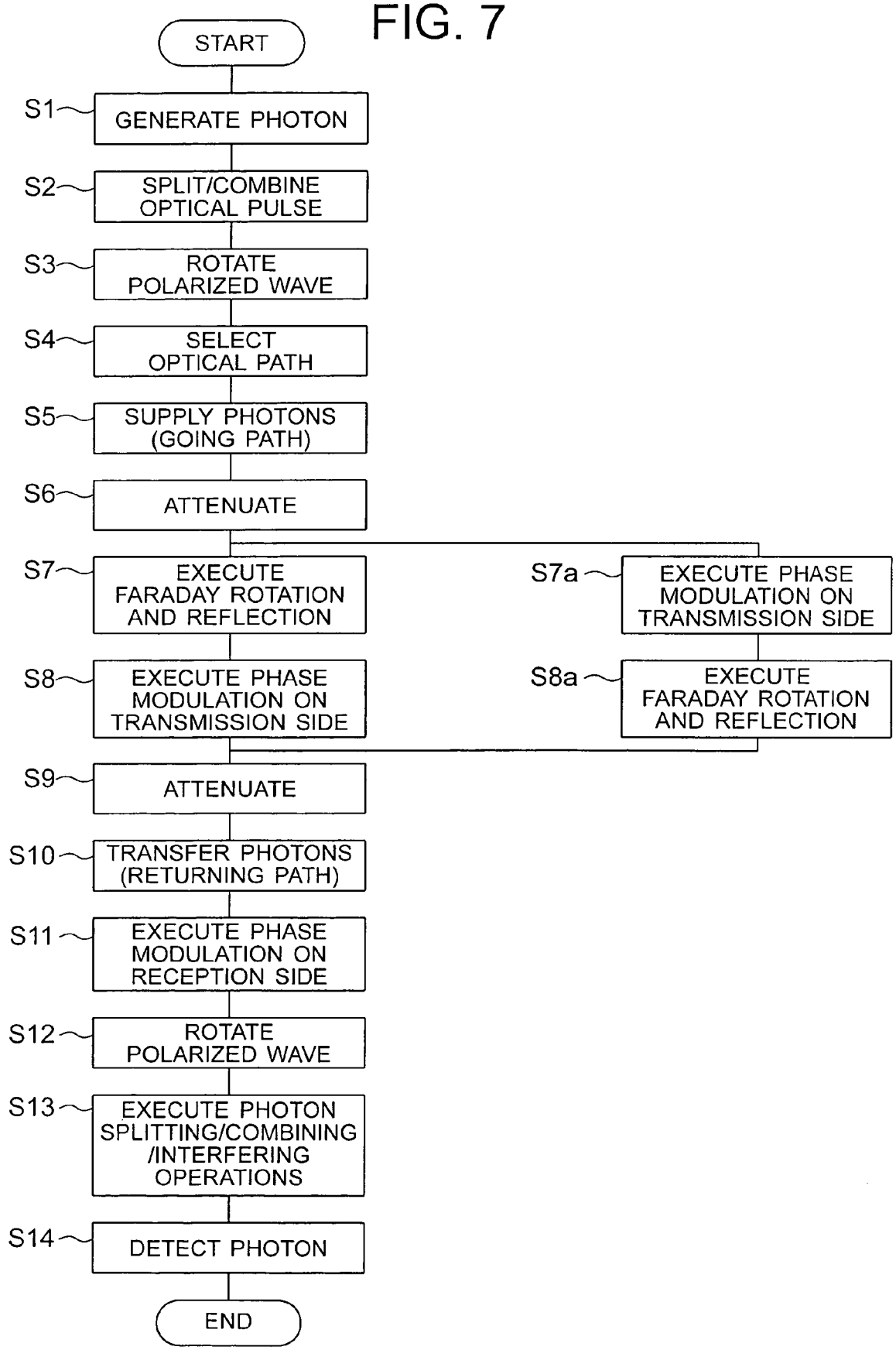

QUANTUM CRYPTOGRAPHIC COMMUNICATION APPARATUS

TECHNICAL FIELD

The present invention relates to a quantum cryptographic apparatus for sharing secret information in quantum cryptography of a phase modulating system by causing a quantum to be modulated by secret information on a transmitter side and transmitted, and further causing the quantum received on a receiver side to be demodulated.

BACKGROUND ART

A quantum cryptographic communication implies a communication system for sharing secret information on a transmitter side and a receiver side, in which the transmitter side modulates quanta, generally speaking, photons based upon the secret information and then transfers the modulated photons, and then, the receiver side demodulates the received quanta. Security of the secret information modulated on the quanta is guaranteed based upon the uncertainty principle of quantum mechanism. It should be noted that since quanta can be easily destroyed and all of information cannot be firmly transferred, random number information is employed as the secret information. The random number information which is transferred between the transmitter side and the receiver side is employed as a cryptographic communication-purpose secret key after a data processing operation such as correcting errors and improving secrecy has been carried out with respect to the random number information. To be more specific, this technical idea is referred to as a quantum key distribution.

On the other hand, a phase modulating system corresponds to such a modulating system which is suitably employed in quantum cryptography in which optical fiber communication is employed as a base. This reason is given as follows. That is, relative phase information of time difference twin photon pulses called as a signal optical pulse and a reference optical pulse may be comparatively held while being transferred through an optical fiber. The relative phase information may be demodulated by monitoring an interference phenomenon which occurs when the signal optical pulse is multiplexed with the reference optical pulse. As a result, generally speaking, a phase modulation type quantum cryptographic communication apparatus has such a structure that an optical path loop which is called as an asymmetrical Mach-Zehnder interferometer used to generate twin photon pulses is provided on the side of a transmitter apparatus, whereas another asymmetrical Mach-Zehnder interferometer having the same dimension as that of the first-mentioned Mach-Zehnder interferometer is provided on the side of a receiver apparatus, which multiplexes and causes the twin photon pulses to interfere with each other.

However, in the quantum cryptographic communication apparatus having the above-explained structure, the below-mentioned two fluctuation effects may give adverse influences which cannot be neglected. That is, one fluctuation effect corresponds to a birefringent polarized wave fluctuation which is in a communication path, and another fluctuation effect corresponds to an optical path length fluctuation which occurs between the two asymmetrical Mach-Zehnder interferometers provided with the transmitter apparatus and the receiver apparatus. Since these two fluctuations occur, in the quantum cryptographic communication apparatus having the above-explained structure, both the polarized waves and the optical path lengths must be continuously adjusted.

With respect to the above-explained fluctuation problem, defect solutions have been progressed. In a quantum cryptographic communication called as a plug & play system, an automatic compensation of polarized wave fluctuations is realized by canceling polarized wave fluctuations effected on a quantum transfer path in a going path and a returning path, since twin photon pulses are reciprocated from a quantum receiver apparatus to a quantum transmitter apparatus and from the quantum transmitter apparatus to the quantum receiver apparatus, and polarization planes of the respective optical pulses are rotated at a right angle in a non-reciprocal manner within the quantum transmitter apparatus, and then, the rotated optical pulses are reflected. Also, an optical path loop which is used so as to generate twin photon pulses having a time difference between signal light and reference light within the quantum receiver apparatus is made identical to an optical path loop which is used so as to multiplex and cause the twin photon pulses to interfere with each other in the quantum receiver apparatus, so that the stable multiplexing and interfering effects capable of compensating the optical path length fluctuations may be realized (refer to, for example, Patent Documents 1 and 3, and Non-patent Document 1).

In the above-described plug & play type quantum cryptographic communication apparatus, in particular, as one structural example of an optical system which constitutes the quantum transmitter apparatus, although not specified to a quantum cryptography-purpose optical system, such an optical system using a polarization rotating mirror may be arranged (refer to, for instance, Patent Document 2).

Patent Document 1: JP 2002-289298 A (paragraph 0033, FIG. 1)

Patent Document 2: JP 5-241104 A (paragraph 0012, FIGS. 4(a) and 5(b))

Patent Document 3: U.S. Pat. No. 6,188,768 B1 (FIGS. 2 and 4, and page 6)

Non-patent Document 1: G. Ribordy, et. al. "Automated "Plug & Play" Quantum Key Distribution" Electronics Letters 34, (22), pp. 2116 to 2117, 1998

The conventional plug & play type quantum cryptographic communication apparatus constitutes a stable system with respect to the fluctuations by reciprocating the photon pulses on the same optical path. As a result, the photon pulses must pass twice through the phase modulator employed in the quantum receiver apparatus in the going path and the returning path. While the repetition frequency of the light source is increased in order to realize the high communication speed, if the photon pulses are oscillated within a shorter time period than a time duration, during which the photon pulses are reciprocated within the optical path, then the timing at which the photon pulses pass through the phase modulator in the going path is approximated to the timing at which the photon pulses pass through the phase modulator in the returning path within a single time period. As a result, there is such a problem in that even when only the photon pulses in the returning path are tried to be phase-modulated, the photon pulses in the going path are also phase-modulated which do not require such the phase modulation, depending upon a selected repetition frequency.

The present invention has been made to solve the above-explained problem, and therefore, has an object to obtain a quantum cryptographic communication apparatus capable of avoiding that a photon pulse in a going path is phase-modulated, and also capable of freely selecting a repetition frequency of a light source in order to increase a communication speed.

DISCLOSURE OF THE INVENTION

A quantum cryptographic communication apparatus according to the present invention is characterized in that the apparatus includes: a quantum communication path for transferring a quantum; a quantum transmitter apparatus provided on a transmission side of the quantum transfer path; a quantum receiver apparatus provided on a reception side of the quantum transfer path; and a control signal communication path connecting the quantum transmitter apparatus with the quantum receiver apparatus, the control signal communication path being used for communicating a control signal containing a synchronization signal between the quantum transmitter apparatus and the quantum receiver apparatus, and in that: the quantum receiver apparatus includes: a light source serving as a quantum source; an optical path loop including a multiplexing/interfering means for generating time difference twin photon pulses composed of both a signal optical pulse and a reference optical pulse from a photon pulse outputted from the light source and for multiplexing and causing interference between the signal optical pulse corresponding to a retrograde quantum and the reference optical pulse; a bypass optical path including a phase modulator which is provided at a port connected to the quantum communication path, and phase-modulates only the reference optical pulse received after the time difference twin photon pulses are reciprocated via the quantum communication path between the quantum transmitter apparatus and the quantum receiver apparatus; and a photon detector for monitoring interference light passed through the optical path loop; the quantum transmitter apparatus includes: a polarized wave rotating means for rotating polarization planes of the twin photon pulses at a right angle in a non-reciprocal manner, the twin photon pulses having reached thereto from the quantum receiver apparatus via the quantum communication path; a phase modulator for phase-modulating a signal optical pulse passed through the polarized wave rotating means and returning the signal optical pulse to the quantum receiver apparatus through the quantum communication path so as to return the phase-modulated signal optical pulse to the quantum receiver apparatus; and a beam attenuating means for attenuating the signal optical pulse such that the signal optical pulse includes less than two photons in the pulse.

BRIEF DESCRIPTION OF THE DRAWINGS

FIG. 7 is a flow chart for explaining quantum communication operations according to Embodiment 2 of the present invention shown in FIG. 5.

BEST MODE FOR CARRYING OUT THE INVENTION

Embodiment 1

Figure 1:
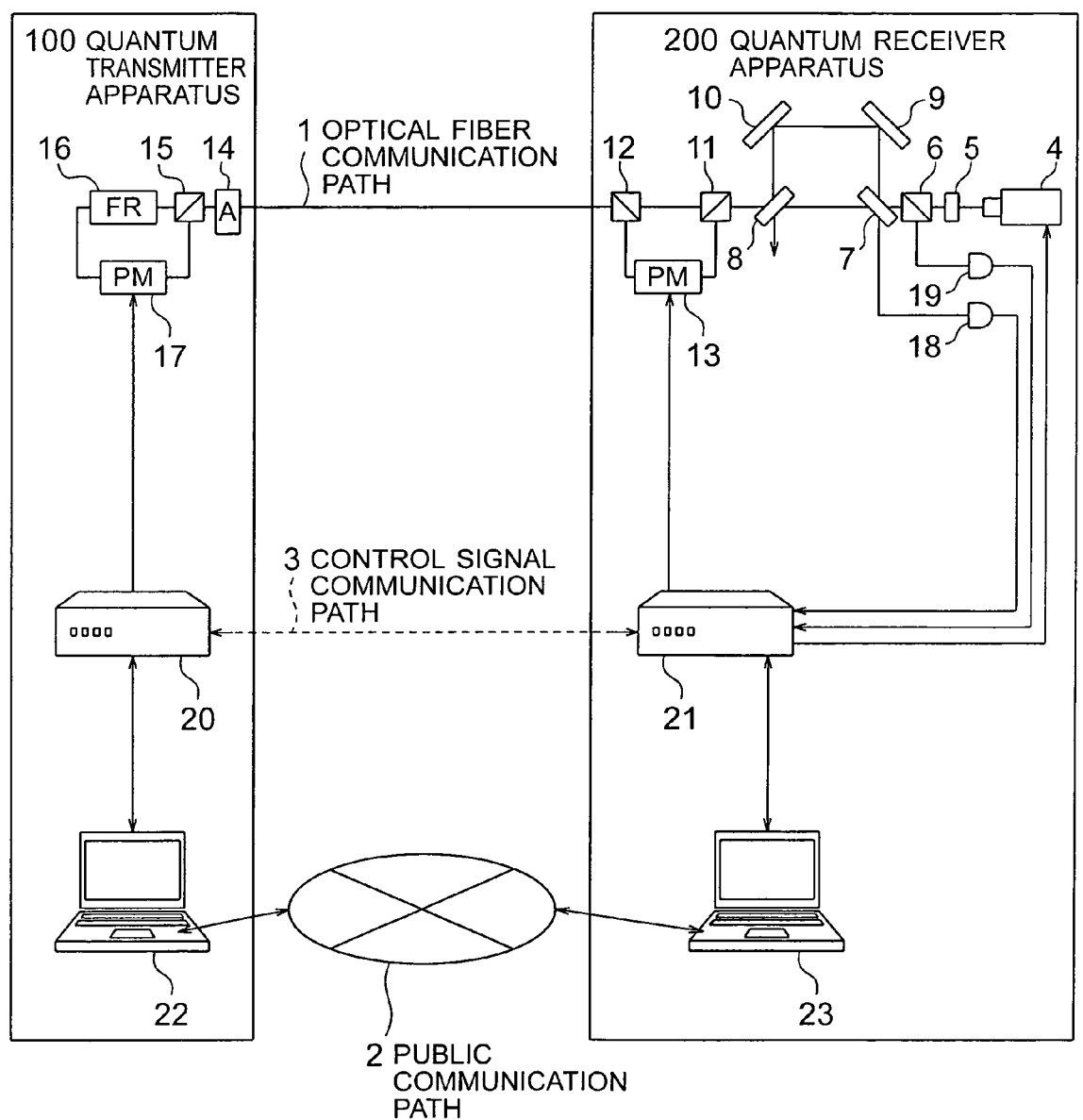
FIG. 1 is a structural diagram indicating a quantum cryptographic communication apparatus according to Embodiment 1 of the present invention.

FIG. 1 is a structural diagram of a quantum cryptographic communication apparatus according to Embodiment 1 of the present invention, and represents an entire structure of the apparatus with employment of a phase modulating system based upon an optical fiber.

The quantum cryptographic communication apparatus shown in FIG. 1 includes a quantum transmitter apparatus 100 on a transmission side, a quantum receiver apparatus 200 on a reception side, an optical fiber communication path 1 which constitutes a quantum transmission path used to connect the quantum transmitter apparatus 100 to the quantum receiver apparatus 200 with each other, a public communication path 2, and a control signal communication path 3.

The quantum transmitter apparatus 100 and the quantum receiver apparatus 200 are connected with each other via the optical fiber communication path 1, the public communication path 2, and the control signal communication path 3. The optical fiber communication path 1 transfers photons which behave as quanta. The public communication path 2 is typically known as a LAN and the Internet.

The optical fiber communication path 1 transfers quantum signals which contain quantum cryptography. The control signal communication path 3 transfers control signals which are used so as to synchronize and start/stop the quantum transmitter apparatus 100 and the quantum receiver apparatus 200. Also, as the control signal communication path 3, concretely speaking, either the optical fiber communication path 1 or the public communication path 3 may be employed.

The quantum transmitter apparatus 100 has a structure which is similar to the optical system described in the above-explained Patent Document 2, and is equipped with an attenuator 14, a polarization beam splitter 15, a Faraday rotator 16, a phase modulator 17, a transmission-side control means 20, and a transmission-side data processing means 22. One terminal of the attenuator 14 is connected to the optical fiber communication path 1. The polarization beam splitter 15 is connected to an optical path of the other terminal of the attenuator 14. The Faraday rotator 16 and the phase modulator 17 are separately connected to the two optical paths of the polarization beam splitter 15. The transmission-side control means 20 controls the phase modulator 17. The transmission-side data processing means 22 is connected to the transmission-side control means 20 and outputs a first random number.

The polarization beam splitter 15, the Faraday rotator 16, and the phase modulator 17 constitute an optical path loop along both rotation directions with respect to a photon pulse for quantum communications. The quantum transmitter apparatus 100 guides a photon pulse which is guided from the quantum receiver apparatus 200 to the Faraday rotator 16 via the optical fiber communication path 1 and the attenuator 14, penetrates the photon pulse through the Faraday rotator (non-reciprocal element) 16 as a polarization rotating means which rotates a polarization plane by a right angle in a non-reciprocal manner, and then, reflects the photon pulse via the attenuator 14 and the optical fiber communication path 1 toward the quantum receiver apparatus 200 to return the photon pulse. It should be noted that the attenuator 14 constitutes an attenuating means which attenuates a signal optical pulse to such a condition that two pieces or more pieces of photons are not contained in the signal optical pulse.

On the other hand, the quantum receiver apparatus 200 is equipped with a photon generator 4, a polarizer 5, a polarization beam splitter 6, a photon detector 19, an asymmetrical Mach-Zehnder interferometer, another photon detector 18, a polarization beam splitter 11, a phase modulator 13, another polarization beam splitter 12, a reception-side control means 21, and a reception-side data processing means 23. The photon generator 4 functions as a light source which generates photons and constitutes a quantum source. One terminal of the polarizer 5 is connected to an output optical path of the photon generator 4. A P-polarized light output port of the polarization beam splitter 6 is connected to the other terminal of the polarizer 5. The photon detector 19 is connected to an S-polarized light output port of the polarization beam splitter 6. The asymmetrical Mach-Zehnder interferometer is constituted of beam splitters 7 and 8, and mirrors 9 and 10, which are arranged at a multiplexed light input port of the polarization beam splitter 6. The photon detector 18 is connected to the remaining output port of the beam splitter 7 of the asymmetrical Mach-Zehnder interferometer. A multiplexed light input port of the polarization beam splitter 11 is connected to an output port of the beam splitter 8 of the asymmetrical Mach-Zehnder interferometer. The phase modulator 13 is connected to an S-polarized light output port of the polarization beam splitter 11. A P-polarized light output port of the polarization beam splitter 12 is connected to a P-polarized light output port of the polarization beam splitter 11, an S-polarized light output port thereof is connected to the other terminal of the phase modulator 13, and further, a multiplexed light input port thereof is connected to the optical fiber communication path 1. The reception-side control means 21 acquires detection signals of the photon detectors 18 and 19, and controls the phase modulator 13, the photon detectors 18 and 19, and the photon generator 4. The reception-side data processing means 23 is connected to the reception-side control means 21, outputs a second random number, and inputs a photon detection signal.

The polarization beam splitter 12 provided in the quantum receiver apparatus 200 is connected via the optical fiber communication path 1 to the attenuator 14 provided in the quantum transmitter apparatus 100. The reception-side control means 21 is connected via the control signal communication path 3 to the transmission-side control means 20. The reception-side data processing means 23 is connected via the public communication path 2 to the transmission-side data processing means 22.

In the quantum receiver apparatus 200, the asymmetrical Mach-Zehnder interferometer constituted by the beam splitter 7 and 8, and the mirrors 9 and 10, forms an optical path loop which separates a photon pulse generated from the photon generator 4 into time difference twin photon pulses made of a signal optical pulse and a reference optical pulse. In this case, the beam splitter 7 functions as a multiplexing/interfering means which multiplexes and causes the signal optical pulse corresponding to a retrograde quantum and the reference optical pulse to interfere with each other.

Also, in the quantum receiver apparatus 200, while the polarization beam splitters 11 and 12 split two polarization modes which are intersected perpendicular to each other, when a P-polarized photon is transferred from the quantum receiver apparatus 200 to the quantum transmitter apparatus 100, such an optical path for shortcircuiting the polarization beam splitters 11 and 12 is selected, whereas when an S-polarized photon is transferred from the quantum transmitter apparatus 100 to the quantum receiver apparatus 200, a bypass optical path for bypassing the phase modulator 13 is selected.

Next, a description is made of the quantum cryptographic communication apparatus shown in FIG. 1, according to Embodiment 1 of the present invention.

The reception-side control means 21 is synchronized and started/stopped with the transmission-side control means 20 employed in the quantum transmitter apparatus 100 by a mutual communication of a control signal via the control signal communication path 3.

The photon generator 4 employed in the quantum receiver apparatus 200 generates photon pulses whose polarization planes match with each other in response to a synchronization signal outputted by the reception-side control means 21.

The polarization planes of the photon pulses generated from the photon generator 4 match with each other by the polarizer 5 which has been set in such a manner that only the polarization planes corresponding to the P-polarized light of the polarization beam splitter 6 pass through the polarizer 5, and then, the photon pulses are entered into the asymmetrical Mach-Zehnder interferometer. The photon pulses entered to the asymmetrical Mach-Zehnder interferometer are separated into twin photon pulses called as a reference optical pulse and a signal optical pulse, which have interferable time difference and whose polarization planes are matches with each other, and then the reference optical pulse and the signal optical pulse are guided to the polarization beam splitter 11.

In this case, the first photon pulse (reference optical pulse) which precedes within the twin photon pulses corresponds to a photon pulse which is directly progressed from the beam splitter 7 to the beam splitter 8, whereas the second photon pulse (signal optical pulse) which succeeds to the first photon pulse corresponds to a photon pulse which is reflected on the beam splitter 7 and then the reflected photon pulse passes through the mirrors 9 and 10. The twin photon pulses guided to the polarization beam splitter 11 pass through the polarization beam splitters 11 and 12 in the stated order, whose polarization planes have been set to be identical to that of the polarization beam splitter 6, and then, are guided to the optical fiber communication path 1 without being guided to the bypass optical path where the phase modulator 13 is provided.

Figure 2A:
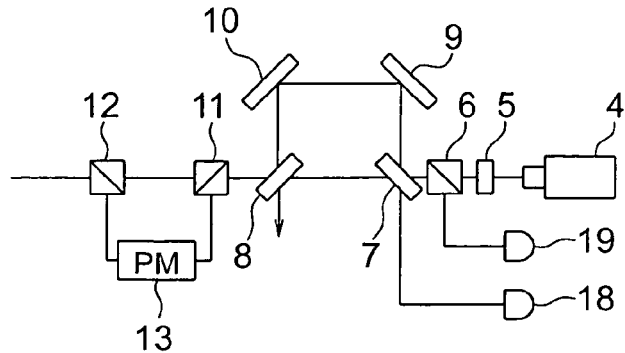
FIG. 2A is a structural diagram of an asymmetrical Mach-Zehnder interferometer and a phase modulator-purpose bypass optical path shown in FIG. 1.
Figure 2B:
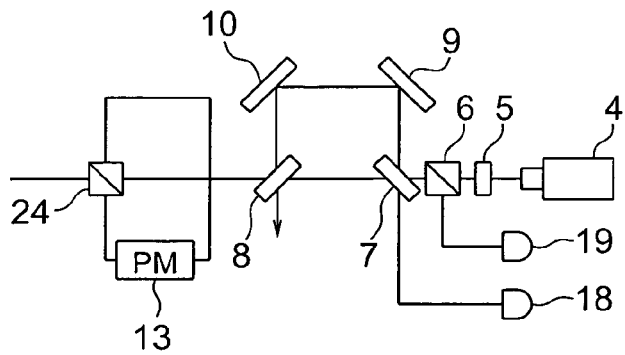
FIG. 2B is a modified structural diagram of the phase modulator-purpose bypass optical path of FIG. 2A.
Figure 2C:
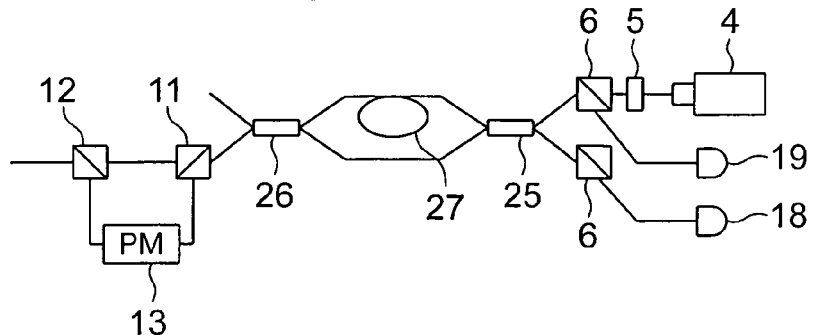
FIG. 2C is another modified structural diagram of the phase modulator-purpose bypass optical path of FIG. 2A.
Figure 2D:
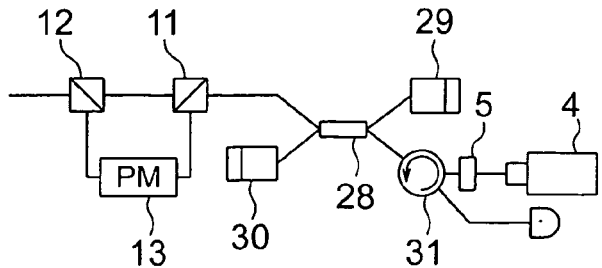
FIG. 2D is another modified structural diagram of the phase modulator-purpose bypass optical path of FIG. 2A.

It should also be noted that various sorts of structures may be alternatively employed as the structural examples of both the asymmetrical Mach-Zehnder interferometer and the phase modulator-purpose bypass optical path shown in FIG. 1. FIG. 2A indicates a structural example of the asymmetrical Mach-Zehnder interferometer shown in FIG. 1, in which the beam splitters 7 and 8 and the mirrors 9 and 10 are employed, and two sets of 1×2 (either 1 input/2 outputs or 2 inputs/1 output) type of polarization beam splitters 11 and 12 are employed as the structural example of the phase modulator-purpose bypass optical path. Alternatively, as indicated in FIG. 2B, there is such a structural example of the bypass optical path that one set of a 2×2 (either 2 inputs/2 outputs or 2 inputs/2 outputs) type polarization beam splitter 24 is employed. As shown in FIG. 2C, there is a structural example of an asymmetrical Mach-Zehnder interferometer with employment of couplers 25 and 26, and a delay fiber 27. As represented in FIG. 2D, there is another structural example of an asymmetrical Mach-Zehnder interferometer with employment of a coupler 28 and Faraday mirrors 29 and 30. Thus, the present invention is not specifically limited to only one specific structural example. It should also be noted that in FIG. 2D, reference numeral 31 indicates a circulator.

The twin photon pulses guided from the quantum receiver apparatus 200 to the optical fiber communication path 1 are guided to the quantum transmitter apparatus 100, the polarization planes of the guided twin photon pulses are rotated at a right angle in a non-reciprocal manner by the Faraday rotator 16 employed in the quantum transmitter apparatus 100, and the signal optical pulse is phase-modulated by the phase modulator 17, and then, the processed twin photon pulses are again fed back to the quantum receiver apparatus 200.

Figure 3A:
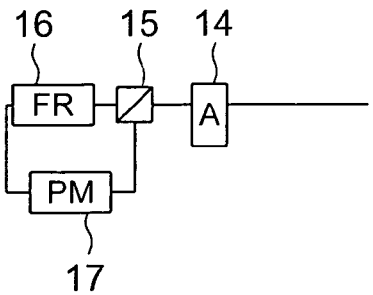
FIG. 3A is a structural diagram of an optical system of a quantum transmitter apparatus shown in FIG. 1.
Figure 3B:
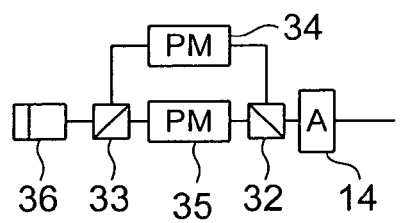
FIG. 3B is a modified structural diagram of the optical system of the quantum transmitter apparatus shown in FIG. 1.
Figure 3C:
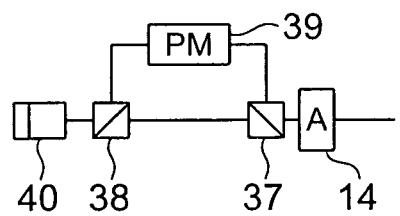
FIG. 3C is another modified structural diagram of the optical system of the quantum transmitter apparatus shown in FIG. 1.
Figure 3D:
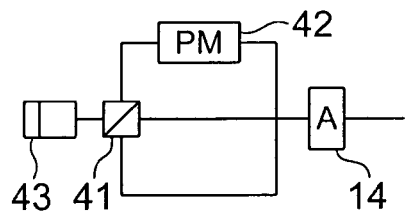
FIG. 3D is another modified structural diagram of the optical system of the quantum transmitter apparatus shown in FIG. 1.
Figure 3E:
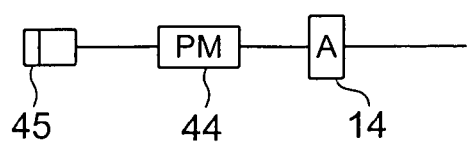
FIG. 3E is another modified structural diagram of the optical system of the quantum transmitter apparatus shown in FIG. 1.

It should also be noted that various sorts of structures may be alternatively employed as the structural example for the optical system of the quantum transmitter apparatus shown in FIG. 1. FIG. 3A shows a structural example of the optical system of the quantum transmitter apparatus indicated in FIG. 1, namely represents such a structural example that the optical system of the quantum transmitter apparatus is constituted by employing the attenuator 14, the polarization beam splitter 15, the Faraday rotator 16, and the phase modulator 17. As indicated in FIG. 3B, there is a structural example that the optical system is constituted by employing two pieces of 1×2 polarization beam splitters 32 and 33, two pieces of phase modulators 34 and 35; and a Faraday mirror 36. As indicated in FIG. 3C, there is another structural example that the optical system is arranged by employing two pieces of 1×2 polarization beam splitters 37 and 38; one piece of phase modulator 39 and a Faraday mirror 40. As indicated in FIG. 3D, there is another structural example that the optical system is constituted by employing one piece of 2×2 polarization beam splitter 41; one piece of phase modulator 42; and a Faraday mirror 43. Also, as shown in FIG. 3E, there is another structural example that the optical system is constituted by employing a phase modulator 44 which does not depend upon a polarized wave, and a Faraday mirror 45. The present invention is not specifically limited to only one structural example.

The twin photon pulses which have been fed back to the quantum receiver apparatus 200 are totally reflected by the polarization beam splitter 12, and then, the reflected twin photon pulses are guided to the bypass optical path where the phase modulator 13 is arranged. The reason is given as follows: that is, in a case where light which enters one terminal of the optical fiber communication path 1 is reflected at the other terminal by rotating the polarization plane thereof at a right angle in a non-reciprocal manner and the reflected light is fed back, even where any birefringent fluctuation is provided in an optical path, the reflected light is fed back under such a condition that the polarization plane has been rotated at the right angle from the time of light incident.

The twin photon pulses which are reflected by the polarization beam splitter 12 are entered to the phase modulator 13. At this time, the phase modulator 13 performs a phase modulation with respect only to the reference optical pulse in response to the second random number outputted by the reception-side data processing means 23 under control of the reception-side control means 21.

The twin photon pulses which pass through the phase modulator 13 are totally reflected by the polarization beam splitter 11 and the reflected twin photon pulses are guided to the asymmetrical Mach-Zehnder interferometer. At this time, the asymmetrical Mach-Zehnder interferometer splits the preceding reference optical pulse into reference light twin photon pulses having a time difference, namely, both a preceding photon pulse of the reference light which is directly traveled from the beam splitter 8 to the beam splitter 7, and a photon pulse which succeeds to the reference light passing through the mirrors 10 and 9. Similarly, this asymmetrical Mach-Zehnder interferometer splits the succeeding signal optical pulse into signal light twin photon pulses having a time difference, namely, both a photon pulse which precedes to the signal light passing through the mirrors 10 and 9, and a preceding photon pulse of signal light which is directly propagated from the beam splitter 8 to the beam splitter 7.

In this case, since the same optical path is employed as a going path and a returning path in the asymmetrical Mach-Zehnder interferometer, the respective time differences of the respective twin photon pulses are automatically and completely identical to each other.

As a result, the succeeding photon pulse of the reference light and the preceding photon pulse of the signal light reach the beam splitter 7 at the same time to induce interference between these photon pulses. The photon pulses which cause the interference are guided to one port which is exclusively connected to any one of paired photon detectors 18 and 19 so as to ignite one of the paired photon detectors. It should also be noted that the photon pulse guided to the port which is connected to the photon detector 19 is totally reflected by the polarization beam splitter 6 and then the reflected photon pulse is guided to the photon detector 19.

The reception-side control means 21 converts such an information that any one of the photon detectors 18 and 19 is ignited into bit information, and then, transfers the bit information to the reception-side data processing means 23. While the reception-side data processing means 23 exchanges a portion of the information with respect to the quantum transmitter apparatus 100 by employing the public communication path 2 based upon the second random number and the bit information transferred as the quantum information, the reception-side data processing means 23 and the quantum transmitter apparatus 100 share random information, in which secrecy is guaranteed.

Next, concrete operations will now be explained with attention to the quantum transmitter apparatus 100.

At a time when the twin photon pulses which have passed from the quantum receiver apparatus 200 through the optical fiber communication path 1 and then have been guided to the quantum transmitter apparatus 100 reach the quantum transmitter apparatus 100, the polarization planes of the twin photon pulses are brought into a completely random condition due to the birefringent fluctuation in the optical fiber communication path 1. Under this condition, the twin photon pulses guided to the quantum transmitter apparatus 100 are attenuated by the attenuator 14, and then, the attenuated twin photon pulses are split into two polarized wave modes (P-polarized light and S-polarized light) which are intersected perpendicular to each other respectively by the polarization beam splitter 15.

Among the photon pulses which have been split into 4 photon pulses in the above-described manner, the twin photon pulses (S-polarized light) which are propagated in a clockwise direction are reflected on the polarization beam splitter 15, and the reflected twin photon pulses pass through the phase modulator 17, and then, the polarization planes thereof are rotated at a right angle by the Faraday rotator 16 in a non-reciprocal manner, and then, the resultant two photon pulses are returned to the polarization beam splitter 15.

Among the photon pulses which have been split to 4 pulses, the twin photon pulses (P-polarized light) which are propagated in a counterclockwise direction pass through the polarization beam splitter 15, and polarization planes thereof are rotated at the right angle by the Faraday rotator 16 in a non-reciprocal manner, and then, the resultant twin photon pulses pass through the phase modulator 17, and then, are returned to the polarization beam splitter 15.

At this time, under control of the transmission-side control means 20, the phase modulator 17 phase-modulates only the signal optical pulse within the twin photon pulses in response to the first random number outputted by the transmission-side control means 22 when the signal optical pulse passes through the phase modulator 17, while not depending upon the propagation direction of either the clockwise direction or the counterclockwise direction.

These 4 photon pulses which have returned to the polarization beam splitter 15 again become twin photon pulses to be guided to the attenuator 14 since the 4 photon pulses have the optical path lengths equal to one another, without depending upon either the clockwise direction or the counterclockwise direction, between when the 4 photon pulses are separated and combined with one another.

In this case, a magnitude of an attenuator of a photon level strength of the attenuator 14 has been adjusted to be such a strength that a total photon number of signal optical pulses does not exceed "1".

As described above, the twin photon pulses which have been again guided to the optical fiber communication path 1 and then fed back to the quantum receiver apparatus 200 are totally reflected on the polarization beam splitter 12 in the above-explained manner, and pass through the bypass optical path in which the phase modulator 13 is arranged, and then, the reflected twin photon pulses are reflected on the polarization beam splitter 11 to be guided to the ports where the photon detectors 18 and 19 are disposed.

Subsequently, the reception-side control means 21 converts information indicating which one of the photon detectors 18 and 19 is ignited, into bit information, and then, transfers the bit information to the reception-side data processing means 23.

After the above-described quantum communication per pulse is repeatedly carried out a predetermined number of times, both the transmission-side data processing means 22 and the reception-side data processing means 23 may share the secrecy information by employing both the information transferred with secrecy via the quantum transfer path (optical fiber communication path 1) and the information transferred via the public communication path 2. In other words, the transmission-side data processing means 22 and the reception-side data processing means 23 share the random information whose secrecy is guaranteed, while employing the public communication path 2 so as to exchange a part of the information based upon the first and second random numbers and the bit information transferred by way of the quantum communication.

Figure 4:
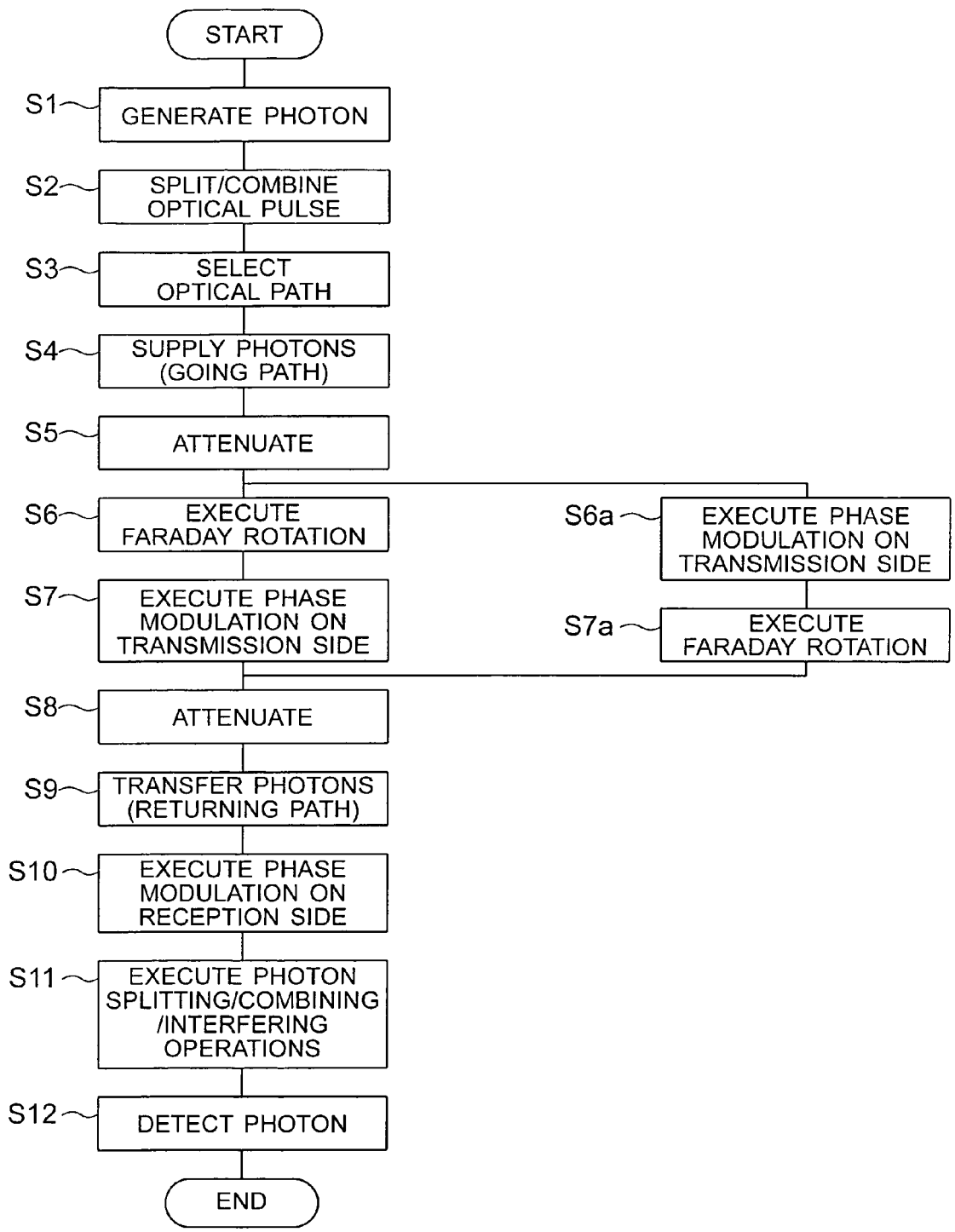
FIG. 4 is a flow chart for explaining quantum communication operations according to Embodiment 1 of the present invention shown in FIG. 1.

Next, a more concrete explanation is made of quantum communication operations according to Embodiment 1 of the present invention, shown in FIG. 1, with reference to a flow chart shown in FIG. 4.

In FIG. 4, processing steps of the quantum communication unit related to photon pulses (quantum cryptography) of the quantum cryptographic communication apparatus include: a step S1 of generating a photon; a step S2 of separating/combining an optical pulse; an optical path selecting step S3 of selecting an optical path which is not routed via the phase modulator 13; a quantum communications-purpose photon supplying (going path) step S4 of supplying a photon from the quantum receiver apparatus 200 to the quantum transmitter apparatus 100; a first attenuate step S5 of a transmission side, a first Faraday rotating step S6; a first transmission-side phase modulating step S7; a second reception-side phase modulation step S6a; a second Faraday rotating step S7a; a second attenuate step S8; a quantum communications-purpose photon transferring (returning path) step S9 of transferring a photon from the quantum transmitter apparatus 100 to the quantum receiver apparatus 200; a reception-side phase modulating step S10; a photon separating/combining/interfering step S11; and a photon detecting step S12.

First, the photon generator 4 in the quantum receiver apparatus 200 generates photon pulses under control of the reception-side control means 21. Among the generated photon pulses, only such a photon pulse which is equivalent to the P-polarized light of the polarization beam splitter 6 by the polarizer 5 passes. The photon pulse whose polarization planes match with those of the P-polarized light passes through the polarization beam splitter 6 (photon generating step S1). It should be noted that photon pulses may be generated in such a way that a total number of photons per pulse follows the Poisson distribution, like a laser beam, or alternatively, a single photon per pulse may be generated by employing a single photon source.

The photon pulse which has passed through the polarization beam splitter 6 is guided to the asymmetrical Mach-Zehnder interferometer which is constituted by the beam splitters 7, 8, and the mirrors 9, 10. The photon pulse which has been guided to the asymmetrical Mach-Zehnder interferometer is separated into two optical paths whose optical path lengths are different from each other within this asymmetrical Mach-Zehnder interferometer, and then, the separated photon pulses are again combined with each other to be outputted, so that this guided photon pulse becomes twin photon pulses having a time difference in response to the optical path lengths (optical pulse separating/combining step S2). It should also be noted that this asymmetrical Mach-Zehnder interferometer is so arranged that the polarization planes are held.

The twin photon pulses outputted from the asymmetrical Mach-Zehnder interferometer are constituted by a preceding reference optical pulse and a succeeding signal optical pulse, and since the polarization planes of any of these photon pulses match with each other in such a manner that the polarization plane thereof becomes P-polarized light with respect to the polarization beam splitters 11 and 12, such an optical path which passes through both the polarization beam splitters 11 and 12 is selected (optical path selecting step S3).

The twin photon pulses which have passed through the polarization beam splitter 12 are guided to the optical fiber communication path 1 to be transferred as they are to the quantum transmitter apparatus 100 (photon supplying (going path) step S4). At this time, due to the birefringent fluctuation in the optical fiber communication path 1, the polarization planes of the twin photon pulses made completely random.

The twin photon pulses which have been guided to the quantum transmitter apparatus 100 pass through the attenuator 14, in which a total number of photons per pulse is attenuated. Then, the attenuated twin photon pulses are guided to the polarization beam splitter 15 (first attenuate step S5).

Also, since the respective polarization planes of the twin photon pulses guided to the quantum transmitter apparatus 100 are random, the twin photon pulses are split by the polarization beam splitter 15 into a photon pulse which circulates in the clockwise direction and a photon pulse which circulates in the counterclockwise direction, and these photon pulses are then combined again with each other by the polarization beam splitter 15 to be returned to twin photon pulses.

In other words, of the twin photon pulses, the photon pulse that circulates counterclockwise passes through the Faraday rotator 16, and the phase modulator 17 in the stated order within the optical path loop. When the photon pulse penetrates through the Faraday rotator 16, the polarization plane thereof is rotated at a right angle in a non-reciprocal manner (first Faraday rotating step S6).

Also, after passing through the Faraday rotator 16, the photon pulse of the counterclockwise direction is guided to the phase modulator 17. When the guided photon pulse passes through the phase modulator 17, only a photon pulse corresponding to the signal optical pulse is phase-modulated (first transmission-side phase modulation step S7).

At this time, the magnitude of the phase modulation is controlled by the transmission-side control means 20, and is determined by performing the phase modulation while the synchronization timing is adjusted via the control signal transmission path 3 according to the first random number outputted by the transmission-side data processing means 22.

On the other hand, of the twin photon pulses guided to the quantum transmitter apparatus 100, the photon pulse that circulates clockwise passes through the phase modulator 17 and the Faraday rotator 16 in the stated order in the optical path loop. Accordingly, the second transmission-side phase modulating step S6*a* is first executed before carrying out the second Faraday rotating step S7*a*. It should also be noted that a rotation of a polarization plane in a non-reciprocal manner by the Faraday rotator (non-reciprocal element) 16 implies that the direction of the rotation does not depend upon a propagation direction of the photon pulse.

Also, in order to allow the phase modulator 17 within the optical path loop to selectively phase-modulate only the signal optical pulse in either of the photon pulse that circulates counterclockwise and the photon pulse that circulates clockwise, a length of an optical path of the optical path loop which contains the polarization beam splitter 15, the Faraday rotator 16, and the phase modulator 17 may be set to be sufficiently short, as compared with the distance corresponding to the time difference between the twin photon pulses that are made incident, which may be easily realized.

The photon pulses which have returned to the twin photon pulses again via the polarization beam splitter 15 pass through the attenuator 14 for a second time. At this time, the strength of the photon level per pulse is attenuated to such a degree that a total number of photons in the signal optical pulse does not exceed "1", and then, the attenuated signal optical pulse is guided to the optical fiber communication path 1 (second attenuate step S8).

The twin photon pulses which have again entered to the optical fiber communication path 1 are fed back toward the quantum receiver apparatus 200. At this time, the polarized wave conditions of the twin photon pulses are again subjected to random variations because of the birefringent fluctuation in the optical fiber communication path 1.

However, the polarization planes of the twin photon pulses that have again entered to the optical fiber communication path 1 have been rotated at the right angle in a non-reciprocal manner by the Faraday rotator 16 provided in the quantum transmitter apparatus 100, so polarized wave variations received on the going path of the optical fiber communication path 1 and polarized wave variations received on the returning path both act to cancel out each other.

As a result, at a time when the re-guided twin photon pulses reach the polarization beam splitter 12 provided in the quantum receiver apparatus 200, the polarization planes of the twin photon pulses have been correctly rotated at the right angle, as compared with those of the twin photon pulses that travels the going path from the polarization beam splitter 12 to the quantum transmitter apparatus 100 (photon transferring (returning path) step S9).

As explained above, the twin photon pulses which have reached the quantum receiver apparatus 200 are guided to the polarization beam splitter 12 with the polarization planes rotated at the right angle which correspond to the S-polarized light with respect to the polarization beam splitter 12, so the twin photon pulses are totally reflected on the polarization beam splitter 12 to be guided to the bypass optical path in which the phase modulator 13 is provided. When the twin photon pulses pass through the phase modulator 13, only the reference optical pulse is phase-modulated (reception-side phase modulation step S10). At this time, the magnitude of the phase modulation is controlled by the reception-side control means 21 to be determined according to the second random number outputted by the reception-side data processing means 23.

After passing through the phase modulator 13, the twin photon pulses are totally reflected by the polarization beam splitter 11 to be again guided to the asymmetrical Mach-Zehnder interferometer, through which the twin photon pulses have passed in the going optical path constructed by the beam splitters 8 and 7, and the mirrors 10 and 9.

The twin photon pulses which have been again guided to the asymmetrical Mach-Zehnder interferometer are separated into two optical paths whose optical path lengths are different from each other, and are separated into 4 photon pulses until these separated photon pulses are combined with each other in a similar manner to the above-explained manner.

That is to say, within the twin photon pulses guided to the asymmetrical Mach-Zehnder interferometer, the reference optical pulse is split to a reference light preceding photon pulse which travels directly from the beam splitter 8 to the beam splitter 7, and to a reference light succeeding photon pulse which passes through the mirrors 10 and 9.

Similarly, the signal optical pulse is split to a signal light preceding photon pulse which travels directly from the beam splitter 8 to the beam splitter 7, and to a signal light succeeding photon pulse which passes through the mirrors 10 and 9.

Although the above-explained 4 photon pulses are again combined with each other by the beam splitter 7, time differences are produced due to differences in the optical path lengths.

It should also be noted that since the reference light preceding/succeeding photon pulses and the signal light preceding/succeeding photon pulses pass through the asymmetrical Mach-Zehnder interferometer in the going path, and again in the returning path, both the reference light succeeding photon pulse and the signal light preceding photon pulse whose time differences are automatically and completely made coincident with each other reach to the beam splitter 7 at the same time and may induce interference (photon separating/combining/interfering step S11).

As a result of the interference occurred in the beam splitter 7, the combined photon pulse between the reference light succeeding photon pulse and the signal light preceding photon pulse is exclusively guided to either of the photon detectors 18 and 19.

It should also be noted that since the polarization plane of the photon pulse guided to the optical path where the photon detector 19 is provided is rotated at an angle close to the right angle, as compared with that of the going path, this photon pulse is totally reflected on the polarization beam splitter 6 and the reflected photon pulse is guided to the photon detector 19.

Determination as to which one of the photon detectors 18 and 19 the combined photon pulse is to be guided to is made stochastically based on a phase difference between the phase modulation given to the signal optical pulse in the first transmission-side phase modulating step S7 and the phase modulation given to the reference optical pulse in the reception-side phase modulating step S10. Note that when the above-explained phase difference is equal to either "0" or "π", the photon detector is defined to which the combined photon pulse is guided is determined with certainty.

As described above, the reference light preceding photon pulse, the combined photon pulses (reference light succeeding photon pulse and signal light preceding photon pulse), and the signal light succeeding photon pulse are guided to the photon detectors 18 and 19 respectively.

In this case, since the timing is adjusted, one of the photon detectors 18 and 19 may be ignited only when the combined photon pulse is guided.

Alternatively, any one of the photon detectors 18 and 19 may be ignited. However, only the ignition of the timing when the combined photon pulse is guided may become effective by the reception-side control means 21.

In any one of these cases, by igniting either the photon detectors 18 and 19 is ignited, the reception-side control means 21 determines the quantum communication bit information of either "0" or "1", and then, transmits this determined quantum communication bit information to the reception-side data processing means 23 (photon detecting step S12).

The above descriptions are the operational flow of the quantum communicating unit per photon pulse.

The above-explained quantum communicating operation is repeatedly carried out predetermined times. Then, while the transmission-side data processing means 22 and the reception-side data processing means 23 mutually exchange information by employing the public communication path 2, both the transmission-side data processing means 22 and the reception-side data processing means 23 share random information whose secrecy is guaranteed based upon the first and second random numbers and the quantum communication bit information.

As described above, as to such a photon pulse which is outputted from the asymmetrical Mach-Zehnder interferometer and then is again guided to the same asymmetrical Mach-Zehnder interferometer within the quantum receiver apparatus 200, even when the polarized wave variations are produced at random due to the arbitrary birefringent fluctuations in the optical fiber communication path 1, the polarization planes of the photon pulse are rotated at the right angle in a non-reciprocal manner on the transmission side (Faraday rotator 16 within quantum transmitter apparatus 100) of the optical fiber communication path 1, and are reciprocated, so that the random polarized wave variations can be canceled with each other.

As a result, since the polarized wave planes of the photon pulses which have been again guided to the asymmetrical Mach-Zehnder interferometer are automatically and completely matched with each other, the polarized wave non-dependent characteristic is not at all required. Even when the re-guided photon pulses have the polarized wave dependent characteristic, the adjustment for the polarized wave planes of the photon pulses is not completely required.

Also, the same asymmetrical Mach-Zehnder interferometer is employed as both the asymmetrical Mach-Zehnder interferometer which is employed in the going path to split the photon pulse into the twin photon pulses, and the asymmetrical Mach-Zehnder interferometer which is employed in the returning path to combine the twin photon pulses with each other in order to interfere with each other. As a result, the adjustment for the optical path length differences is not completely required, and also, the optical path length fluctuations are automatically compensated, so that the stable interference system can be constructed.

Also, while the bypass optical path which passes through the phase modulator 13 is provided in the optical path within the quantum receiver apparatus 200 and the polarization planes are rotated at the right angle within the quantum transmitter apparatus 100 in the above-explained manner, the photon pulse automatically selects such an optical path that the phase modulator 13 is not provided in the going path directed from the photon generator 4 toward the optical fiber communication path 1, whereas the photon pulse automatically selects such a bypass optical path in which the phase modulator 13 is provided. As a result, the flow of the photon pulse in the phase modulator 13 is limited only to one direction, and there is no risk of the photon pulse being phase-modulated in an improper manner, so that the repetition frequency for generating the photon pulses can be freely selected.

Embodiment 2

In the above-explained Embodiment 1, since the polarization planes of the twin photon pulses match with each other, only the polarization beam splitters 11 and 12 are used to realize the bypass optical circuit in which the phase modulator 13 is arranged. Embodiment 2 discloses a case of realizing a bypass optical circuit in which a phase modulator is arranged by using polarization beam splitters and a polarization modulator, in the case where polarization planes of twin photon pulses do not match with each other as in the optical systems described in Patent Documents 1 and 3, and Non-patent Document 1.

Figure 5:
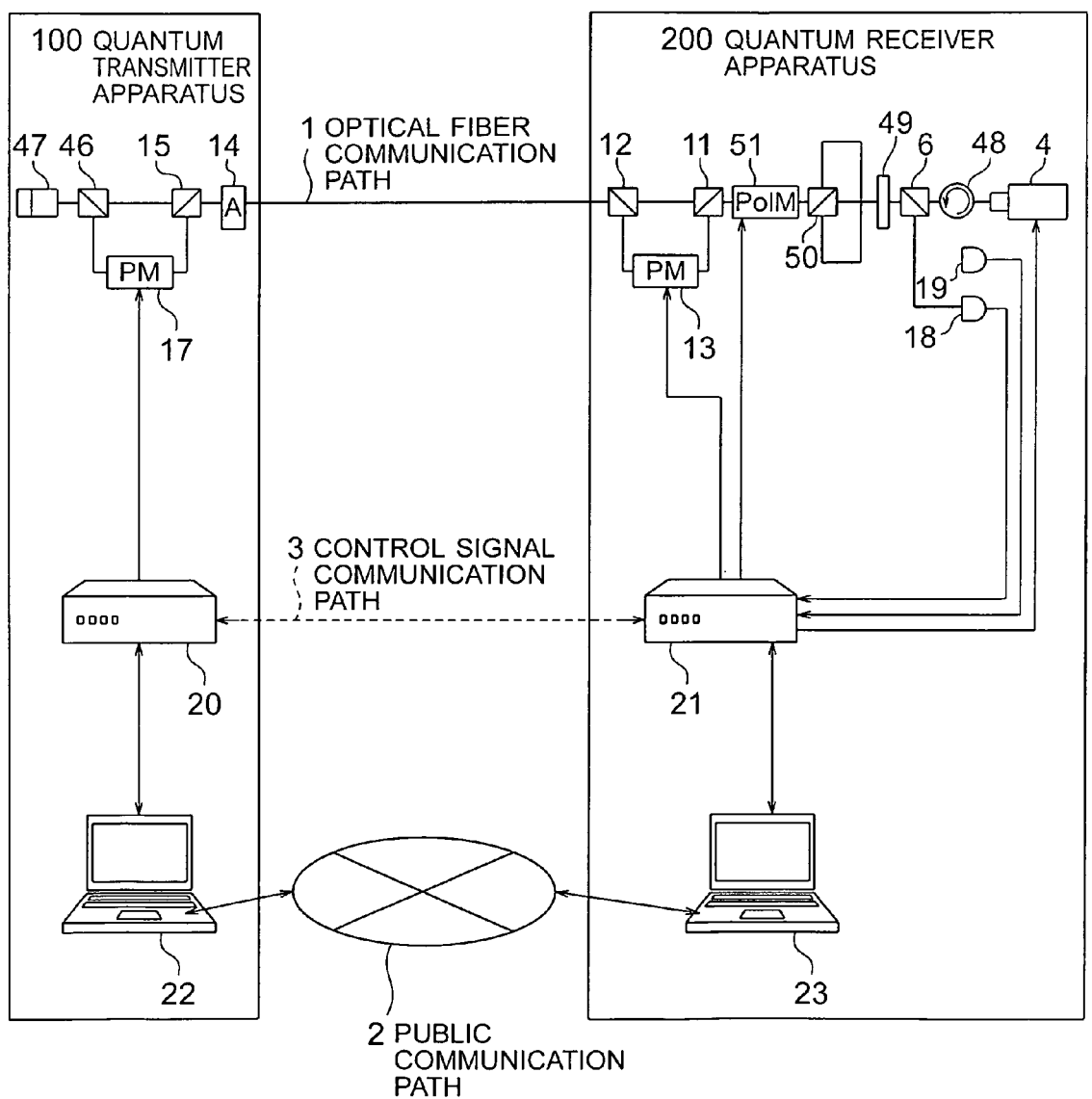
FIG. 5 is a structural diagram of a quantum cryptographic communication apparatus according to Embodiment 2 of the present invention.

FIG. 5 is a structural diagram representing a quantum cryptographic communication apparatus according to Embodiment 2 of the present invention which includes a quantum receiver apparatus 200 provided with a polarization modulator 9 therein. In FIG. 5, a quantum transmitter apparatus 100 has a similar structure to the optical system described in Patent Document 3, and is provided with an attenuator 14, a polarization beam splitter 15, another polarization beam splitter 46, a Faraday mirror 47, a phase modulator 17, a transmission-side control means 20, and a transmission-side data processing means 22. The attenuator 14 is connected at one optical terminal thereof to an optical fiber communication path 1. The polarization beam splitter 15 is connected to the other optical terminal of the attenuator 14. The polarization beam splitter 46 is connected to a P-polarized light output port of the polarization beam splitter 15. The Faraday mirror 47 is connected to a multiplexed light input port of the polarization beam splitter 46. The phase modulator 17 are connected at both terminals thereof to S-polarized light output ports of the polarization beam splitters 15 and 46. The transmission-side control means 20 controls the phase modulator 17. The transmission-side data processing means 22 is connected to the transmission-side control means 20 and outputs a first random number.

The polarization beam splitters 15 and 46, the Faraday mirror 47, and the phase modulator 17 constitute an optical path loop along both rotation directions with respect to a photon pulse for quantum communications.

The quantum transmitter apparatus 100 guides a photon pulse, which has been guided by the quantum receiver apparatus 200, to the Faraday mirror 47 via the optical fiber communication path 1 and the attenuator 14 so as to rotate a polarization plane of the guided photon pulse in a non-reciprocal manner, and then, reflects the photon pulse again via the attenuator 14 and the optical fiber communication path 1 toward the quantum receiver apparatus 200.

The quantum receiver apparatus 200 is equipped with a photon generator 4; a circulator 48 connected to an output optical path of the photon generator 4; a polarization beam splitter 6 having the P-polarized light output port connected to the other terminal of the circulator 48; a photon detector 19 connected to another terminal of the circulator 48; a half-wave plate 49 connected to the multiplexed light input port of the polarization beam splitter 6; a photon detector 18 connected to the S-polarized light output port of the polarization beam splitter 6; a 2×2 polarization beam splitter 50 having the P-polarized light output port connected to the half-wave plate 49; and an optical path loop which shortcircuits another port that is located opposite to the S-polarized light output port of the polarization beam splitter 50. The quantum receiver apparatus 200 is further equipped with a polarization modulator 51 connected to the multiplexed light input port of the polarization beam splitter 50; a polarization beam splitter 11 having the multiplexed light input port connected to the polarization modulator 51; a phase modulator 13 connected to the S-polarized light output port of the polarization beam splitter 11; another beam splitter 12; a reception-side control means 21; and a reception-side data processing means 23. The polarization beam splitter 12 has the P-polarized light output port connected to the S-polarized light output port of the polarization beam splitter 11, the S-polarized light output port of this polarization beam splitter 12 connected to the other terminal of the phase modulator 13, and the multiplexed light input port thereof connected to the optical fiber communication path 1. The reception-side control means 21 acquires detection signals from the photon detectors 18 and 19, and controls the polarization modulator 51, the phase modulator 13, the photon detectors 18 and 19, and the photon generator 4. The reception-side data processing means 23 is connected to the reception-side control means 21, outputs a second random number, and inputs a photon detection signal.

The polarization beam splitter 12 provided in the quantum receiver apparatus 200 is connected via the optical fiber communication path 1 to the attenuator 14 provided in the quantum transmitter apparatus 100. The reception-side control means 21 is connected via the control signal communication path 3 to the transmission-side control means 20. The reception-side data processing means 23 is connected via the public communication path 2 to the transmission-side data processing means 22.

In the quantum receiver apparatus 200, twin photon pulses are outputted from the polarization beam splitter 50 toward the polarization modulator 51, a preceding reference optical pulse has a polarization plane of P-polarized light, whereas a succeeding signal optical pulse has a polarization plane of S-polarized light. As a result, the polarization modulator 51 rotates only the polarization plane of the signal optical pulse which passes therethrough at a right angle, and when the signal optical pulse is transferred from the quantum receiver apparatus 200 to the quantum transmitter apparatus 100, the polarization modulator 51 causes the polarization planes to be aligned with the P-polarized light and to penetrate the polarization beam splitters 11 and 12.

When the S-polarized twin photon pulses are fed back to the quantum receiver apparatus 200 from the quantum transmitter apparatus 100, such an optical path is selected that the S-polarized twin photon pulses are reflected on the polarization beam splitter 12 and are propagated through the phase modulator 13. The twin photon pulses which have passed through the phase modulator 13 are reflected on the polarization beam splitter 11 and pass through the polarization modulator 51, and when the twin photon pulses pass through the polarization modulator 51, the polarization modulator 51 rotates the polarization plane of only the signal optical pulse at a right angle so as to obtain a polarization plane of P-polarized light. As a result, the reference optical pulse is totally reflected by the polarization beam splitter 50, and the reflected reference optical pulse passes through the optical path loop to be directed to the half-wave plate 49, whereas the signal optical pulse passes through the polarization beam splitter 50 to directly travel to the half-wave plate 49.

Next, a description is made of an operation of the quantum cryptographic communication apparatus according to Embodiment 2 shown in FIG. 5 of the present invention.

The reception-side control means 21 is synchronized and started/stopped with the transmission-side control means 20 provided in the quantum transmitter apparatus 100, through mutual communications of a control signal via the control signal communication path 3. The photon generator 4 provided in the quantum receiver apparatus 200 generates photon pulses whose polarization planes match with each other, in response to a synchronization signal outputted by the reception-side control means 21.

A photon pulse generated by the photon generator 4 enters, via the circulator 48, the polarization beam splitter 6. It is so assumed that a polarization plane of the photon pulse matches with P-polarized light of the polarization beam splitter 6.

The photon pulse penetrates the polarization beam splitter 6 and then is guided to the half-wave plate 49. After the polarization plane of the photon pulse is rotated by an angle of 45 degrees by the half-wave plate 49, the resulting photon pulse enters the polarization beam splitter 50. Since the polarization plane of the photon pulse is inclined by 45 degrees, this photon pulse is split into two photon pulses, namely, a reference optical pulse corresponding to the P-polarized light and a signal optical pulse corresponding to the S-polarized light. After the signal optical pulse passes through the optical path loop, the signal optical pulse is outputted from the multiplexed light output port connected to the polarization modulator 51 of the polarization beam splitter 50, and such twin photon pulses which are constituted of the preceding reference optical pulse and the succeeding signal optical pulse are guided to the polarization modulator 51.

Of the twin photon pulses guided to the polarization modulator 51, the signal optical pulse corresponding to the S-polarized light has the polarization plane rotated by the polarization modulator 51 by a right angle, so that this rotated-S-polarized light becomes P-polarized light. As a result, after the signal optical pulse has passed through the polarization modulator 51, the twin photon pulses guided to the polarization beam splitter 11 pass through the polarization beam splitters 11 and 12 in the stated order, and are then, are guided to the optical fiber communication path 1 without being guided to the bypass circuit provided with the phase modulator 13.

Figure 6A:
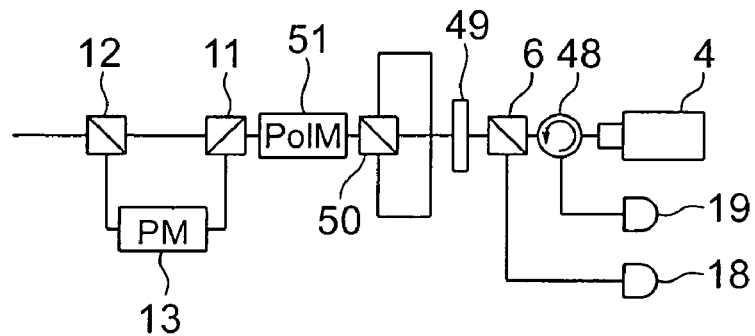
FIG. 6A is a structural diagram of an optical system of a quantum receiver apparatus shown in FIG. 5.
Figure 6B:
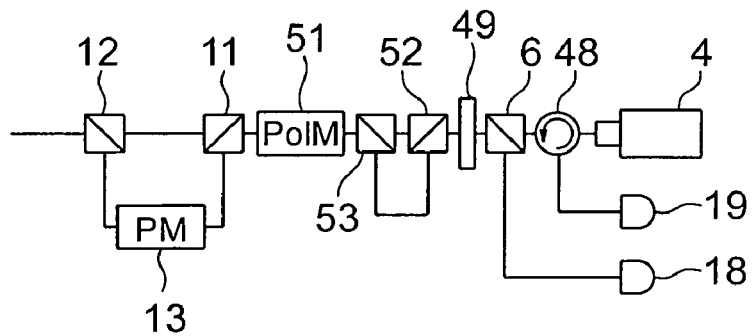
FIG. 6B is a modified structural diagram of the optical system of the quantum receiver apparatus shown in FIG. 5.
Figure 6C:
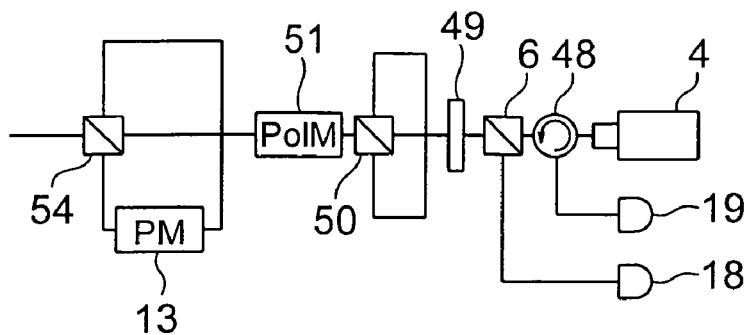
FIG. 6C is another modified structural diagram of the optical system of the quantum receiver apparatus shown in FIG. 5.
Figure 6D:
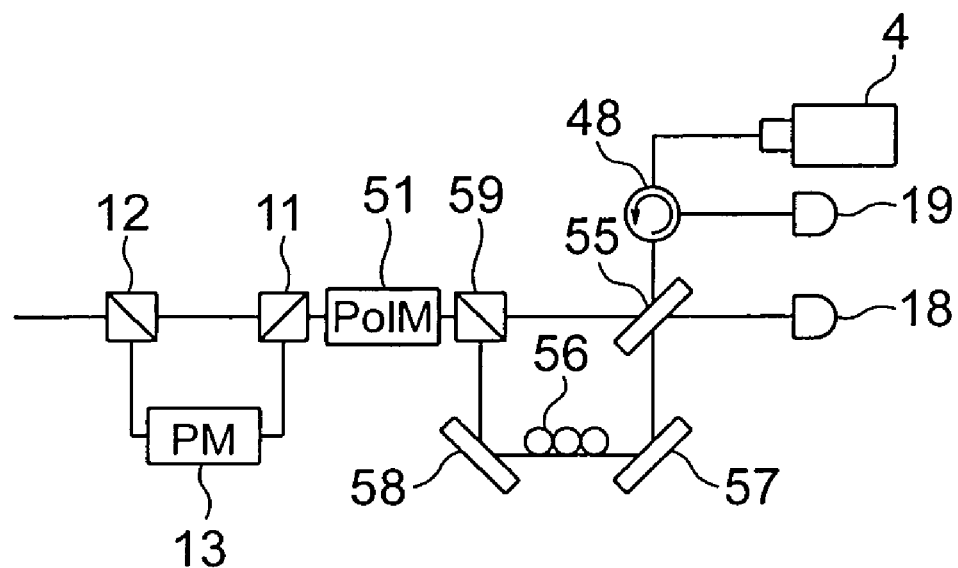
FIG. 6D is another modified structural diagram of the optical system of the quantum receiver apparatus shown in FIG. 5.
Figure 6E:
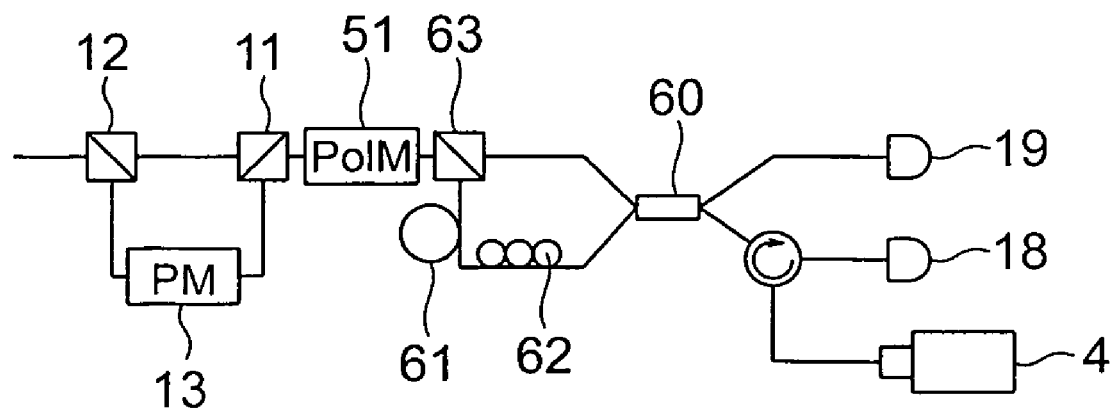
FIG. 6E is another modified structural diagram of the optical system of the quantum receiver apparatus shown in FIG. 5.

It should also be noted that various sorts of structures may be alternatively employed as the structural examples of the optical system of the quantum receiver apparatus 200 shown in FIG. 5. FIG. 6A shows a structural example of an optical system used in the quantum receiver apparatus 200 of FIG. 5 for separating a single photon pulse into twin photon pulses to be outputted. The optical system includes the 1×2 polarization beam splitter 6, the half-wave plate 49, the 2×2 polarization beam splitter 50, and the optical path loop. As regards a structural example of a phase modulator-purpose bypass optical path, a structure which includes two sets of polarization beam splitters 11 and 12 of the 1×2 type, and the polarization modulator 51 is shown. Alternatively, as shown in FIG. 6B, there is another structural example of a twin photon pulse splitting/outputting optical system which employs two sets of polarization beam splitters 52 and 53 of 1×2 type. Also, as indicated in FIG. 6C, there is further another structural example of a bypass optical path which employs one set of a 2×2 polarization beam splitter 54. Alternatively, as shown in FIG. 6D, there is still another structural example of another twin photon pulse splitting/outputting optical system which employs a beam splitter 55, a polarization controller 56, mirrors 57 and 58, and a polarization beam splitter 59. Also, as shown in FIG. 6E, there is another structural example of a twin photon pulse splitting/outputting optical system which employs a coupler 60, a delay fiber 61, a polarization controller 62, and a polarization beam splitter 63. Accordingly, the present invention is not specifically limited only to one specific structural example.

The twin photon pulses guided from the quantum receiver apparatus 200 to the optical fiber communication path 1 are guided to the quantum transmitter apparatus 100, the polarization planes of the guided twin photon pulses are rotated at a right angle in a non-reciprocal manner by the Faraday mirror 47 employed in the quantum transmitter apparatus 100, and the signal optical pulse is phase-modulated by the phase modulator 17, and then, the processed twin photon pulses are again fed back to the quantum receiver apparatus 200.

It should also be noted that FIG. 5 shows, as a structural example for the optical system of the quantum transmitter apparatus 100, a structure composed of the attenuator 14, the polarization beam splitters 15 and 46, the Faraday mirror 47, and the phase modulator 17. Similar to Embodiment 1, there are other structural examples as shown in FIG. 3A to FIG. 3E, and thus, the present invention is not specifically limited to only one specific structural example.

The twin photon pulses which have been fed back to the quantum receiver apparatus 200 are totally reflected by the polarization beam splitter 12, and then, the reflected twin photon pulses are guided to the bypass optical path provided with the phase modulator 13. This reason is given as follows: that is, light which has entered to one terminal of the optical fiber communication path 1 is fed back on such a condition that the polarization plane has been rotated at the right angle at the time when the light entered in a case where the light is fed back by being reflected at the other terminal with the polarization plane thereof being rotated at a right angle in a non-reciprocal manner, regardless of any birefringent fluctuation present in a halfway optical path.

The twin photon pulses which are reflected by the polarization beam splitter 12 enters to the phase modulator 13. At this time, the phase modulator 13 performs a phase modulation with respect only to the reference optical pulse in response to the second random number outputted by the reception-side data processing means 23 under control of the reception-side control means 21.

The twin photon pulses which pass through the phase modulator 13 are totally reflected by the polarization beam splitter 11 and the reflected twin photon pulses are guided to the polarization modulator 51. When the twin photon pulses pass through the polarization modulator 51, only the signal optical pulse has the polarization plane thereof rotated by the polarization modulator 51 by the right angle, and the signal optical pulse corresponding to the S-polarized light is converted to the P-polarized light.

The twin photon pulses which have passed through the polarization modulator 51 are guided to the polarization beam splitter 50. The reference optical pulse corresponding to the S-polarized light is totally reflected on the polarization beam splitter 50, and then, the reflected reference optical pulse is guided to the half-wave plate 49 after passing through the optical path loop. On the other hand, the signal optical pulse corresponding to the P-polarized light passes through the polarization beam splitter 50, and then guided to the half-wave plate 49.

At this time, the reference optical pulse passes through the same optical path loop as the optical path loop through which the signal optical pulse has passed when being directed to the quantum transmitter apparatus 100 from the quantum receiver apparatus 200, so the time difference between the reference optical pulse and the signal optical pulse is completely canceled, and thus, the reference optical pulse and the signal optical pulse may induce a combination/interference effect as a single photon pulse. As to the photon pulse which has induced the interference, in the case of this interference, the polarization plane thereof exclusively becomes any one of two polarization planes which are intersected perpendicular to each other.

The polarization plane of the photon pulse which has been guided to the half-wave plate 49 and has induced the interference is rotated by an angle of −45 degrees, and then, the rotated photon pulse is guided to the polarization beam splitter 6. As a result of the interference, the photon pulse which has been guided to the polarization beam splitter 6 is guided to one port which is exclusively connected to any one of one-paired photon defectors 18 and 19, and then, ignites one of these photon detectors 18 and 19. It should also be noted that the photon pulse guided to the port which is connected to the photon detector 19 is guided to the photon detector 19 by the circulator 48.

The reception-side control means 21 converts information indicating which one of the photon detectors 18 and 19 is ignited, into bit information, and transfers the bit information to the reception-side data processing means 23.

While the reception-side data processing means 23 exchanges a part of the information with the quantum transmitter apparatus 100 by using the public communication path 2 based upon the second random number and the bit information transferred as the quantum information, the reception-side data processing means 2 and the quantum transmitter apparatus 100 share random information whose secrecy is guaranteed.

Next, concrete operations will now be explained while paying an attention to the quantum transmitter apparatus 100.

The twin photon pulses which have passed from the quantum receiver apparatus 200 through the optical fiber communication path 1 to be guided to the quantum transmitter apparatus 100 has the polarization planes of the twin photon pulses are brought into a completely random condition due to the birefringent fluctuation in the optical fiber communication path 1 at the time of reaching the quantum transmitter apparatus 100.

Under this condition, the twin photon pulses guided to the quantum transmitter apparatus 100 are attenuated by the attenuator 14, and then, the attenuated twin photon pulses are split by the polarization beam splitter 15 into two polarized wave modes (P-polarized light and S-polarized light) which are intersected perpendicular to each other respectively.

Among the photon pulses which have been split into 4 photon pulses in the above-described manner, the twin photon pulses (S-polarized light) which are propagated in a clockwise direction are reflected on the polarization beam splitter 15, and the reflected twin photon pulses pass through the phase modulator 17, and then, the reflected twin photon pulses are reflected on the polarization beam splitter 46 to be guided to the Faraday mirror 47. After the polarization planes of the twin photon pulses are rotated at a right angle and reflected by the Faraday mirror 47 in the non-reciprocal manner, the rotated/reflected twin photon pulses pass through the polarization beam splitter 46 and then returns to the polarization beam splitter 15.

Among the photon pulses which have been split into 4 pulses, the twin photon pulses (P-polarized light) which are propagated in a counterclockwise direction pass through the polarization beam splitters 15 and 46, and polarization planes thereof are rotated at the right angle by the Faraday mirror 47 in the non-reciprocal manner, and then, the resultant twin photon pulses are reflected on the polarization beam splitter 46 to pass through the phase modulator 17, and then returns to the polarization beam splitter 15.

At this time, under control of the transmission-side control means 20, the phase modulator 17 phase-modulates, in accordance with the first random number outputted by the transmission-side control means 22, only the signal optical pulse among the twin photon pulses when the signal optical pulse passes through the phase modulator 17, without depending upon the propagation direction of either the clockwise direction or the counterclockwise direction.

These 4 photon pulses which have returned to the polarization beam splitter 15 again become twin photon pulses to be guided to the attenuator 14 since the 4 photon pulses have the optical path lengths equal to one another, without depending upon either the clockwise direction or the counterclockwise direction, between when the 4 photon pulses are separated and when combined with one another. In this case, a magnitude of an attenuator of a photon level strength of the attenuator 14 has been adjusted to be such a strength that a total photon number of signal optical pulses does not exceed "1".

As described above, the twin photon pulses which have been again guided to the optical fiber communication path 1 and then fed back to the quantum receiver apparatus 200 are totally reflected on the polarization beam splitter 12 in the above-explained manner, and pass through the bypass optical path in which the phase modulator 13 is arranged, and then, the reflected twin photon pulses are reflected on the polarization beam splitter 11 to be guided to the ports where the photon detectors 18 and 19 are disposed.

Subsequently, the reception-side control means 21 converts information indicating which one of the photon detectors 18 and 19 is ignited, into bit information, and then, transfers the bit information to the reception-side data processing means 23.

After the above-described quantum communication per pulse is repeatedly carried out a predetermined number of times, both the transmission-side data processing means 22 and the reception-side data processing means 23 may share the secrecy information by employing both the information transferred with secrecy via the quantum transfer path (optical fiber communication path 1) and the information transferred via the public communication path 2. In other words, the transmission-side data processing means 22 and the reception-side data processing means 23 share the random information whose secrecy is guaranteed, while employing the public communication path 2 so as to exchange a part of the information based upon the first and second random numbers and the bit information transferred by way of the quantum communication.

Next, a more concrete explanation is made of quantum communication operations according to Embodiment 2 of the present invention, shown in FIG. 5, with reference to a flow chart shown in FIG. 7.

In FIG. 7, processing steps of the quantum communication unit related to photon pulses (quantum cryptography) of the quantum cryptographic communication apparatus include: the step S1 of generating a photon; the step S2 of separating/combining an optical pulse; a first polarized wave rotating step S3 of rotating a polarization plane of a signal optical pulse; an optical path selecting step S4 of selecting an optical path in which the phase modulator 13 is not provided; a quantum communications-purpose photon supplying (going path) step S5 of supplying a photon from the quantum receiver apparatus 200 to the quantum transmitter apparatus 100, a first attenuate step S6 on a transmission side; a first Faraday rotating and reflecting step S7; a first transmission-side phase modulating step S8; a second reception-side phase modulation step S7a; a second Faraday rotating and reflecting step S8a; a second attenuate step S9; quantum communications-purpose photon transferring (returning path) step S10 of transferring a photon from the quantum transmitter apparatus 100 to the quantum receiver apparatus 200; a reception-side phase modulating step S11; a second polarized wave rotating step S12 of again rotating the polarization plane of the signal optical pulse, a photon separating/combining/interfering step S13, and a photon detecting step S14.

First, the photon generator 4 in the quantum receiver apparatus 200 generates photon pulses under control of the reception-side control means 21. The generated photon pulses are guided to the polarization beam splitter 6 by the circulator 48. The polarization planes of the photon pulses have been aligned to match the P-polarized light (photon generating step S1). It should be noted that photon pulses may be generated in such a way that a total number of photons per pulse is determined based on the Poisson distribution, like a laser pulse, or alternatively, a single photon per pulse may be generated by employing a single photon source.

The photon pulse guided to the polarization beam splitter 6 passes through the polarization beam splitter 6 and is then guided to the half-wave plate 49 by which the polarization plane of the guided photon pulse is rotated by an angle of 45 degrees. The photon pulse whose polarization plane has been rotated by 45 degrees is guided to the polarization beam splitter 50 so as to be split into a reference optical pulse corresponding to the P-polarized light and a signal optical pulse corresponding to the S-polarized light. The signal optical pulse travels through the optical path loop, and then, is combined with the reference pulse to be outputted as twin photon pulses toward the polarization modulator 51 (optical pulse separating and combining step S2).

Of the twin photon pulses guided to the polarization modulator 51, only the signal optical pulse has the polarization plane rotated at the right angle so that polarization planes of the twin photon pulses match with each other (first polarized wave rotating step S3).

The twin photon pulses outputted from the polarization modulator 51 include the reference optical pulse and the signal optical pulse whose polarization planes both match each other in such a manner that each of the polarization plane becomes P-polarized light with respect to the polarization beam splitters 11 and 12, so the optical path which passes through both the polarization beam splitters 11 and 12 is selected (optical path selecting step S4).

The twin photon pulses which have passed through the polarization beam splitter 12 are guided to the optical fiber communication path 1 to be transferred as they are to the quantum transmitter apparatus 100 (photon supplying (going path) step S5). At this time, due to the birefringent fluctuation in the optical fiber communication path 1, the polarization planes of the twin photon pulses are made completely random.

The twin photon pulses which have been guided to the quantum transmitter apparatus 100 pass through the attenuator 14, in which a total number of photons per pulse is attenuated. Then, the attenuated twin photon pulses are guided to the polarization beam splitter 15 (first attenuate step S6).

Also, since the respective polarization planes of the twin photon pulses guided to the quantum transmitter apparatus 100 are random, the twin photon pulses are split by the polarization beam splitter 15 into a photon pulse which circulates in the clockwise direction and a photon pulse which circulates in the counterclockwise direction, and these photon pulses are then combined again with each other by the polarization beam splitter 46 to be returned to twin photon pulses.

In other words, of the twin photon pulses, the photon pulse that circulates counterclockwise passes through the polarization beam splitter 46, the Faraday mirror 47, the polarization beam splitter 46, and the phase modulator 17 in the stated order within the optical path loop. When the photon pulse penetrates through the Faraday mirror 47, the polarization plane thereof is rotated and reflected at a right angle in a non-reciprocal manner (first Faraday rotating and reflecting step S7).

Also, the photon pulse of the counterclockwise direction is reflected by the Faraday mirror 47 before being guided to the phase modulator 17. When the photon pulse passes through the phase modulator 17, only a photon pulse corresponding to the signal optical pulse is phase-modulated (first transmission-side phase modulation step S8).

At this time, the magnitude of the phase modulation is controlled by the transmission-side control means 20, and is determined by performing the phase modulation while the synchronization timing is adjusted via the control signal transmission path 3 according to the first random number outputted by the transmission-side data processing means 22.

On the other hand, of the twin photon pulses guided to the quantum transmitter apparatus 100, the photon pulse that circulates clockwise passes through the phase modulator 17 and the Faraday mirror 47 in the stated order in the optical path loop. Accordingly, the second transmission-side phase modulating step S7a is first executed before carrying out the second Faraday rotating and reflecting step S8a. It should also be noted that a rotation of a polarization plane in a non-reciprocal manner by the Faraday mirror (non-reciprocal element) 47 implies that the direction of the rotation does not depend upon a propagation direction of the photon pulse.

Also, in order to allow the phase modulator 17 within the optical path loop to selectively phase-modulate only the signal optical pulse in either of the photon pulse that circulates counterclockwise and the photon pulse that circulates clockwise, a length of an optical path of the optical path loop which contains the polarization beam splitter 15, 46, the Faraday mirror 47, and the phase modulator 17 may be set to be sufficiently short, as compared with the distance corresponding to the time difference between the twin photon pulses that are made incident, which may be easily realized.

The photon pulses which have returned to the twin photon pulses again via the polarization beam splitter 15 pass through the attenuator 14 for a second time. At this time, the strength of the photon level per pulse is attenuated to such a degree that a total number of photons in the signal optical pulse does not exceed "1", and then, the attenuated signal optical pulse is guided to the optical fiber communication path 1 (second attenuate step S9).

The twin photon pulses which have again entered to the optical fiber communication path 1 are fed back toward the quantum receiver apparatus 200. At this time, the polarized wave conditions of the twin photon pulses are again subjected to random variations because of the birefringent fluctuation in the optical fiber communication path 1.

However, the polarization planes of the twin photon pulses that have again entered to the optical fiber communication path 1 have been rotated at the right angle in the non-reciprocal manner by the Faraday mirror 47 provided in the quantum transmitter apparatus 100, so the polarized wave variations received on the going path of the optical fiber communication path 1 and the polarized wave variations received on the returning path both act to cancel out each other.

As a result, at a time when the re-guided twin photon pulses reach the polarization beam splitter 12 provided in the quantum receiver apparatus 200, the polarization planes of the twin photon pulses have been correctly rotated at the right angle, as compared with those of the twin photon pulses that travels the going path from the polarization beam splitter 12 to the quantum transmitter apparatus 100 (photon transferring (returning path) step S10).

As explained above, the twin photon pulses which have reached the quantum receiver apparatus 200 are guided to the polarization beam splitter 12 with the polarization planes rotated at the right angle which correspond to the S-polarized light with respect to the polarization beam splitter 12, so the twin photon pulses are totally reflected on the polarization beam splitter 12 to be guided to the bypass optical path in which the phase modulator 13 is provided. When the twin photon pulses pass through the phase modulator 13, only the reference optical pulse is phase-modulated (reception-side phase modulation step S11). At this time, the magnitude of the phase modulation is controlled by the reception-side control means 21 to be determined according to the second random number outputted by the reception-side data processing means 23.

After passing through the phase modulator 13, the twin photon pulses are totally reflected by the polarization beam splitter 11 to be guided to the polarization modulator 51.

When the twin photon pulses guided to the polarization modulator 51 pass through the polarization modulator 51, the polarization plane of only the signal optical pulse is rotated by the right angle, so the S-polarized light is converted into the P-polarized light (second polarized light rotating step S12).

As to the twin photon pulses guided from the polarization modulator 51 to the polarization beam splitter 50, the reference optical pulse is totally reflected on the polarization beam splitter 50 and passes through the optical path loop. As a result, when the twin photon pulses are outputted from the polarization beam splitter 50, both the reference optical pulse and the signal optical pulse are outputted at the same time and are combined with each other to become a single photon pulse. When the reference optical pulse is combined with the signal optical pulse, interference is guided. As a result of the interference, the polarization plane of the single photon pulse exclusively constitutes any one of the polarization planes which are intersected perpendicular to each other.

The photon pulse which has induced the interference is guided to the half-wave plate 49 and the polarization plane thereof is rotated by an angle of −45 degrees. The photon pulse which has induced the interference and has the polarization plane rotated by −45 degrees is guided to the polarization beam splitter 6 to be outputted to any one port of the photon detectors 18 and 19 (photon separating/combining/interfering step S13). The photon pulse which has induced the interference is exclusively guided to any one of the photon detectors 18 and 19.

It should also be noted that the photon pulse which has been guided to an optical path leading to the photon detector 19 is guided to the photon detector 19 by the circulator 48.

Determination as to which one of the photon detectors 18 and 19 the photon pulse which has induced the interference is to be guided to is made stochastically based on a phase difference between the phase modulation given to the signal optical pulse in the first transmission-side phase modulating step S8 and the phase modulation given to the reference optical pulse in the reception-side phase modulating step S11. Note that when the above-explained phase difference is equal to either "0" or "π", the photon detector to which the combined photon pulse is to be guided is determined with certainty.

The reception-side control means 21 determines the quantum communication bit information of either "0" or "1" according to that any one of the photon detectors 18 and 19 is ignited, and transmits this determined quantum communication bit information to the reception-side data processing means 23 (photon detecting step S14).

The above descriptions are the operation flows of the quantum communicating unit per photon pulse.

The above-explained quantum communicating operation is repeatedly carried out predetermined times. Then, while the transmission-side data processing means 22 and the reception-side data processing means 23 mutually exchange information by using the public communication path 2 to share the random information whose secrecy is guaranteed based upon the first and second random numbers and the quantum communication bit information.

As described above, in a photon pulse outputted from the quantum receiver apparatus 200 to be again guided to the quantum receiver apparatus 200, even when the random polarized wave variations are caused due to the arbitrary birefringent fluctuations in the optical fiber communication path 1, the polarization planes of the photon pulse are rotated and reflected at the right angle in the non-reciprocal manner on the transmission side (Faraday mirror 47 within quantum transmitter apparatus 100) of the optical fiber communication path 1 to be reciprocated, thereby making it possible to cancel the random polarized wave variations.

As a result, since the polarized wave planes of the photon pulses which have been again guided to the quantum receiver apparatus 200 automatically and completely match with each other, the polarized wave non-dependent characteristic is not at all required. Even when the re-guided photon pulses have the polarized wave dependent characteristic, the adjustment for the polarized wave planes of the photon pulses is not required at all.

Also, the same optical system is employed for both the optical system which is employed in the going path so as to split the photon pulse into the twin photon pulses and for the optical system which is employed in the returning path so as to combine the twin photon pulses with each other in order to interfere with each other. As a result, the adjustment for the optical path length differences is not required at all, and also, the optical path length fluctuations are automatically compensated, thereby making it possible to construct the stable interference system.

Also, in the optical path provided in the quantum receiver apparatus 200, even in a case where the polarization planes of the twin photon pulses do not match with one another, the following structure can be utilized, in which only one photon pulse is selectively polarized and modulated so that the polarization planes match with one another; the bypass optical path which passes through the phase modulator 13 is provided; and the polarization plane is rotated at the right angle within the quantum transmitter apparatus 100 in the above-described manner. With this structure, the photon pulse automatically selects, as the going path directed from the photon generator 4 toward the optical fiber communication path 1, an optical path in which the phase modulator 13 is not provided, whereas the photon pulse automatically selects, as the returning path directed from the optical fiber communication path 1 toward the photon detectors 18 and 19, a bypass optical path in which the phase modulator 13 is provided. As a result, the flow of the photon pulse in the phase modulator 13 is limited only to one direction, and there is no such a risk that the photon pulse is phase-modulated in the improper manner, thereby making it possible to freely select the repetition frequency for generating the photon pulses.

INDUSTRIAL APPLICABILITY

As described above, according to the present invention, it is possible to realize a quantum cryptographic communication apparatus capable of operating under a stable condition with respect to the fluctuations of the optical path lengths without requiring the control operation of the polarization plane and capable of freely selecting the operation frequency.

The invention claimed is:

1. A quantum cryptographic communication apparatus, comprising:
a quantum communication path for transferring a quantum;
a quantum transmitter apparatus provided on a transmission side of the quantum transfer path;
a quantum receiver apparatus provided on a reception side of the quantum transfer path; and
a control signal communication path connecting the quantum transmitter apparatus with the quantum receiver apparatus, the control signal communication path being used for communicating a control signal containing a synchronization signal between the quantum transmitter apparatus and the quantum receiver apparatus, and in that:
a quantum receiver apparatus comprises:
a light source serving as a quantum source;
an optical path loop including a multiplexing/interfering means for generating time difference twin photon pulses composed of both a signal optical pulse and a reference optical pulse from a photon pulse outputted from the light source and for multiplexing and causing interference between the signal optical pulse corresponding to a retrograde quantum and the reference optical pulse;

a bypass optical path including a phase modulator which is provided at a port connected to the quantum communication path, and phase-modulates only the reference optical pulse received after the time difference twin photon pulses are reciprocated via the quantum communication path between the quantum transmitter apparatus and the quantum receiver apparatus; and a photon detector for monitoring interference light passed through the optical path loop;

the quantum transmitter apparatus comprises:

a polarized wave rotating means for rotating polarization planes of the twin photon pulses at a right angle in a non-reciprocal manner, the twin photon pulses having reached thereto from the quantum receiver apparatus via the quantum communication path;

a phase modulator for phase-modulating a signal optical pulse passes through the polarized wave rotating means and returning the signal optical pulse to the quantum receiver apparatus through the quantum communication path so as to return the phase-modulated signal optical pulse to the quantum receiver apparatus; and a beam attenuating means for attenuating the signal optical pulse such that the signal optical pulse includes less than two photons in the pulse.

2. The quantum cryptographic communication apparatus according to claim 1, wherein:

the bypass optical path is provided with a polarization beam splitter, the polarization beam splitter being provided at a branch point between a transmission optical path and a reception optical path of the bypass optical path; and the polarization beam splitter allows, in a case where the polarization plane of the signal optical pulse of the twin photon pulses is equal to the polarization plane of the reference optical pulse thereof, only a fed-back photon pulse to pass through the reception optical path in which the phase modulator is provided.

3. The quantum cryptographic communication apparatus according to claim 1, wherein a polarization modulator is provided between the optical path loop and the bypass optical path, the polarization modulator serving to align, in a case where the polarization plane of the signal optical pulse of the twin photon pulses is different from the polarization plane of the reference optical pulse thereof, the polarization planes of the twin photon pulses to match with each other in a going path by rotating the polarization plane of the signal optical pulse only when the signal optical pulse passes therethrough.

4. The quantum cryptographic communication apparatus according to claim 2, wherein the polarization beam splitter includes two sets of 1×2 input/output type polarization beam splitters for guiding only a photon pulse having a specific polarization plane to the reception optical path in which the phase modulator is provided.

5. The quantum cryptographic communication apparatus according to claim 2, wherein the polarization beam splitter includes one set of 2×2 input/output type polarization beam splitter for guiding only a photon pulse having a specific polarization plane to the reception optical path in which the phase modulator is provided.

* * * * *